United States Patent
Moshayedi (10) Patent No.: US 8,347,138 B2
(45) Date of Patent: Jan. 1, 2013

(54) REDUNDANT DATA DISTRIBUTION IN A FLASH STORAGE DEVICE

(75) Inventor: Mark Moshayedi, Newport Coast, CA (US)

(73) Assignee: STEC, Inc., Santa Ana, CA (US)

( * ) Notice: Subject to any disclaimer, the term of this patent is extended or adjusted under 35 U.S.C. 154(b) by 742 days.

(21) Appl. No.: 12/492,107

(22) Filed: Jun. 25, 2009

(65) Prior Publication Data

US 2009/0327840 A1 Dec. 31, 2009

Related U.S. Application Data

(60) Provisional application No. 61/075,709, filed on Jun. 25, 2008.

(51) Int. Cl.
*G06F 11/18* (2006.01)
(52) U.S. Cl. .......... 714/6.21; 711/103; 714/766
(58) Field of Classification Search .......... 714/710, 714/6.21, 766, 773; 711/103
See application file for complete search history.

(56) References Cited

U.S. PATENT DOCUMENTS

| | | | | |
|---|---|---|---|---|
| 5,680,579 A * | 10/1997 | Young et al. | .................. | 711/157 |
| 6,567,889 B1 * | 5/2003 | DeKoning et al. | ............ | 711/114 |
| 7,574,554 B2 * | 8/2009 | Tanaka et al. | ................. | 711/103 |
| 7,640,390 B2 * | 12/2009 | Iwamura et al. | .............. | 711/103 |
| 7,650,480 B2 * | 1/2010 | Jiang | ............................. | 711/165 |
| 7,831,764 B2 * | 11/2010 | Nakajima et al. | ............. | 711/103 |
| 7,840,877 B2 * | 11/2010 | Jacobson | ...................... | 714/770 |
| 7,873,619 B1 * | 1/2011 | Faibish et al. | ................. | 707/705 |
| 7,873,803 B2 * | 1/2011 | Cheng | ........................... | 711/161 |
| 7,934,055 B2 * | 4/2011 | Flynn et al. | .................. | 711/114 |
| 8,086,914 B2 * | 12/2011 | Kimmel et al. | ............... | 714/710 |
| 8,130,554 B1 * | 3/2012 | Linnell | .................... | 365/185.28 |
| 2008/0098192 A1 | 4/2008 | Im et al. | | |
| 2009/0157950 A1 | 6/2009 | Selinger | | |

* cited by examiner

*Primary Examiner* — Stephen M Baker
(74) *Attorney, Agent, or Firm* — McDermott Will & Emery LLP

(57) ABSTRACT

A flash storage device comprises a plurality of channels of flash storage, a system memory, and a controller. The controller is configured to cache, in the system memory, data to be written, to partition the data into a plurality of data portions, to generate error correction information based on the plurality of data portions, to write the error correction information to a first one or more of the plurality of channels of flash storage, and to write each of the plurality of data portions to a different one of the plurality of channels of flash storage other than the first one or more thereof.

32 Claims, 9 Drawing Sheets

REDUNDANT DATA DISTRIBUTION IN A FLASH STORAGE DEVICE

CROSS-REFERENCE TO RELATED APPLICATION

The present application claims the benefit of priority under 35 U.S.C. §119 from U.S. Provisional Patent Application Ser. No. 61/075,709, entitled "SOLID STATE DEVICE," filed on Jun. 25, 2008, the disclosure of which is hereby incorporated by reference in its entirety for all purposes.

FIELD OF THE INVENTION

The present invention relates to flash storage devices and, in particular, relates to redundant data distribution in a flash storage device.

BACKGROUND OF THE INVENTION

Flash memory is an improved form of Electrically-Erasable Programmable Read-Only Memory (EEPROM). Traditional EEPROM devices are only capable of erasing or writing one memory location at a time. In contrast, flash memory allows multiple memory locations to be erased or written in one programming operation. Flash memory can thus operate at higher effective speeds than traditional EEPROM.

Flash memory enjoys a number of advantages over other storage devices. It generally offers faster read access times and better shock resistance than a hard disk drive (HDD). Unlike dynamic random access memory (DRAM), flash memory is non-volatile, meaning that data stored in a flash storage device is not lost when power to the device is removed. For this reason, a flash memory device is frequently referred to as a flash storage device, to differentiate it from volatile forms of memory. These advantages, and others, may explain the increasing popularity of flash memory for storage applications in devices such as memory cards, USB flash drives, mobile phones, digital cameras, mass storage devices, MP3 players and the like.

Flash storage devices, like all storage devices, are subject to events which may cause data stored therein to be lost. Whether due to routine wear on the device or external forces (e.g., impact, temperature variations, electro-static discharge or the like), the data stored in a flash storage device may be corrupted or even irrevocably lost.

SUMMARY OF THE INVENTION

Various aspects of the subject disclosure solve the foregoing problem by providing methods and devices for distributing redundant data in a flash storage device, by which lost or corrupted data can be transparently (e.g., to the host) rebuilt. By partitioning data into portions and distributing them among different channels of a "stripe," together with error correction information pertaining to the portions, corruption or loss one or more data portions may be rectified by rebuilding the missing data using both the error correction information and the other portions in the stripe.

According to one aspect of the subject disclosure, a flash storage device comprises a plurality of channels of flash storage, a system memory, and a controller. The controller is configured to cache, in the system memory, data to be written, to partition the data into a plurality of data portions, to generate error correction information based on the plurality of data portions, to write the error correction information to a first one or more of the plurality of channels of flash storage, and to write each of the plurality of data portions to a different one of the plurality of channels of flash storage other than the first one or more thereof.

According to another aspect of the subject disclosure, a method of writing data to a flash storage device comprises the steps of caching, in a system memory, data to be written, partitioning the data into a plurality of data portions, generating error correction information based on the plurality of data portions, writing the error correction information to a first one or more of a plurality of channels of flash storage of the flash storage device, and writing each of the plurality of data portions to a different one of the plurality of channels of flash storage other than the first one or more thereof.

According to another aspect of the subject disclosure, a flash storage device comprises a plurality of channels of flash storage and a controller configured to detect an error in reading first data from a first data portion in a first one of the plurality of channels of flash storage. The controller is further configured to recover the first data by reading second data from a second data portion in a second one of the plurality of channels of flash storage, reading error correction information from a third data portion in a third one of the plurality of channels of flash storage, and determining the first data based on the second data and the error correction information.

According to another aspect of the subject disclosure, a method of reading data from a flash storage device comprises the step of detecting an error in reading first data from a first data portion in a first one of a plurality of channels of flash storage in the flash storage device. The method further comprises the step of recovering the first data by reading second data from a second data portion in a second one of the plurality of channels of flash storage, reading error correction information from a third data portion in a third one of the plurality of channels of flash storage, and determining the first data based on the second data and the error correction information.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
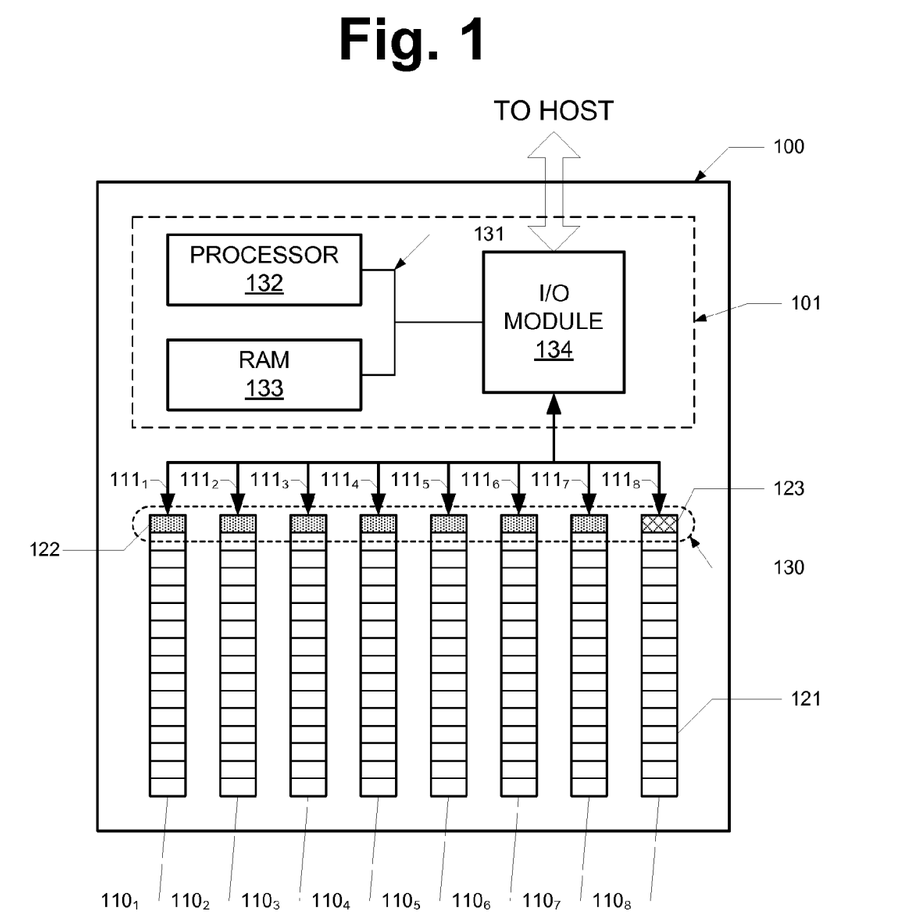
FIG. 1 illustrates a flash storage device in accordance with one aspect of the subject disclosure.

Referring to FIG. 1, a block diagram of a flash storage device according to one aspect of the subject disclosure is depicted. Flash storage device 100 includes a controller 101 and a number of non-volatile data blocks $110_1$, $110_2$, $110_3$, $110_4$, $110_5$, $110_6$, $110_7$ and $110_8$ which communicate with controller 101 via separate channels $111_1$-$111_8$. While the term "data block" is used throughout the description, it will be understood by those of skill in the art that the term data block is frequently used interchangeably with the term "memory block" in the art. Each data block has a plurality of data segments for storing data.

In the present exemplary flash storage device, each data block is illustrated as including 16 data segments. The scope of the present invention, however, is not limited to such an arrangement. Rather, as will be apparent to one of skill in the art, a data block may be configured with more or less than 16 data segments as desired to provide various levels of storage space. For example, in accordance with one aspect of the subject disclosure, a data block may include 32 data segments of 4 kilobytes (kB) each to provide 128 kB of data storage. While data blocks are usually configured with $2^n$ data segments (e.g., 16, 32, 64, 128, 256, etc.), the scope of the invention is not so limited. Similarly, while each data block $110_1$-$110_8$ is illustrated as including the same number of data segments, the scope of the invention is not so limited, as a flash storage device may comprise a number of data blocks with differing capacities and/or numbers of data segments. In accordance with one aspect of the subject disclosure, a data block may span over more than one flash memory chip in a storage array of multiple chips. In accordance with another aspect, a data block is stored on a single flash memory chip in a storage array of multiple flash memory chips.

While in the present exemplary flash storage device 100, each channel is illustrated as connecting controller 101 to a single data block, the scope of the present invention is not limited to such an arrangement. Rather, as will be apparent to one of skill in the art, a single channel may connect a controller to any number of data blocks. For example, in accordance with one aspect of the subject disclosure, a single channel may connect a controller of a flash storage device to one or more flash memory chips, each of which may include one or more data blocks. Moreover, while the present exemplary flash storage device 100 is illustrated as including exactly eight channels, the scope of the present invention is not so limited. Rather, as will be apparent to one of skill in the art, a flash storage device may include any number of channels by which a controller communicates to an array of data blocks. Moreover, while the present exemplary flash storage device 100 is illustrated with a single channel communicating with each illustrated data block, the scope of the present invention is not so limited. Rather, the present invention may have application to flash storage devices in which multiple channels communicate with a single storage block (e.g., in flash storage devices employing multi-cycle programming).

Controller 101 includes a bus 131 or other communication mechanism for communicating information, and a processor 132 coupled with bus 131 for processing information. Controller 101 also includes a volatile memory such as random access memory (RAM) 133 coupled to bus 131 for storing information and instructions to be executed by processor 132. RAM 133 may also be used for storing temporary variables or other intermediate information during execution of instructions by processor 132. According to one aspect of the subject disclosure, RAM 133 may comprise one or more DRAM or RAM modules. Controller 101 may be coupled via I/O module 134 and channels $111_1$-$111_8$ to data blocks $110_1$-$110_8$, and to an external system with which flash storage device 100 communicates.

Different types of data segments are illustrated with different graphical conventions in FIG. 1. In particular, empty data segments, such as data segment 121, are indicated by a white field surrounded with a black line, data segments containing host data (e.g., data addressable by a host device), such as data segment 122, are indicated by a shaded field surrounded by a black line, and data segments containing error correction information, such as data segment 123, are indicated by a hatched field surrounded by a black line.

According to one aspect of the subject disclosure, controller 101 is configured to redundantly distribute data in flash storage device 100 in the following manner. Upon receiving data to be written from a host device, controller 101 caches the data in RAM 133 until a quantity of data sufficient to fill a data "stripe" has been cached. Controller 101 is then configured to partition the cached data into a number of portions corresponding to the number of channels available for data in a stripe, minus a number of channels to be used for error correction information. Controller 101 is configured to generate error correction information based on the portions of data, and to write both the data portions and the error correction information to data segments in separate channels of the stripe.

For example, with reference to FIG. 1, upon caching sufficient data to populate seven of the eight data segments in stripe 130, controller 101 partitions the cached data into seven portions, and generates error correction information based upon those seven portions. For example, the error correction information may be parity information generated by performing an exclusive disjunction ("XOR") operation on the seven data portions. Once the error correction information is generated, controller 101 writes the seven data portions to the corresponding data segments in each of data blocks $110_1$-$110_7$ (via channels $111_1$-$111_7$) and writes the error correction information to the corresponding data segment (data segment 123) in data block $110_8$ via channel $111_8$.

As can be seen with reference to FIG. 1, stripe 130 consists of a number of similarly-address data segments located in separate channels (i.e., located in separate data blocks with which controller 101 communicated via separate channels). Using similarly-addressed data segments (i.e., data segments with a same offset from the first physical location in each respective channel) allows an addressing table of flash storage device 100 to simplify the correlation between host logical addresses and physical addresses in flash storage device 100. In this regard, according to one aspect of the subject disclosure, an addressing table of flash storage device 100 may be configured to store, for data associated with a particular logical address, the channel in which the data is stored, the stripe in which the data is stored, and which channel of that stripe stores the error correction information.

According to one aspect of the subject disclosure, by including error correction information and associated data portions in separate channels of flash storage device 100, controller 101 may be able to recover data in one or more of the data segments of stripe 130 which has become corrupted. For example, in the present exemplary embodiment in which the error correction information is parity information created by an XOR operation, should the data in data segment 122 become corrupted, controller 101 may recover the corrupted data by performing a bitwise XOR operation on the error correction information in data segment 123 and the data in the other data segments in stripe 130 (i.e., the shaded data segments in data blocks $110_2$-$110_7$). The recovered data may then be re-written to data segment 122, or alternatively may be written to another data segment in a different stripe (and an addressing table updated with the new location).

Figure 2:
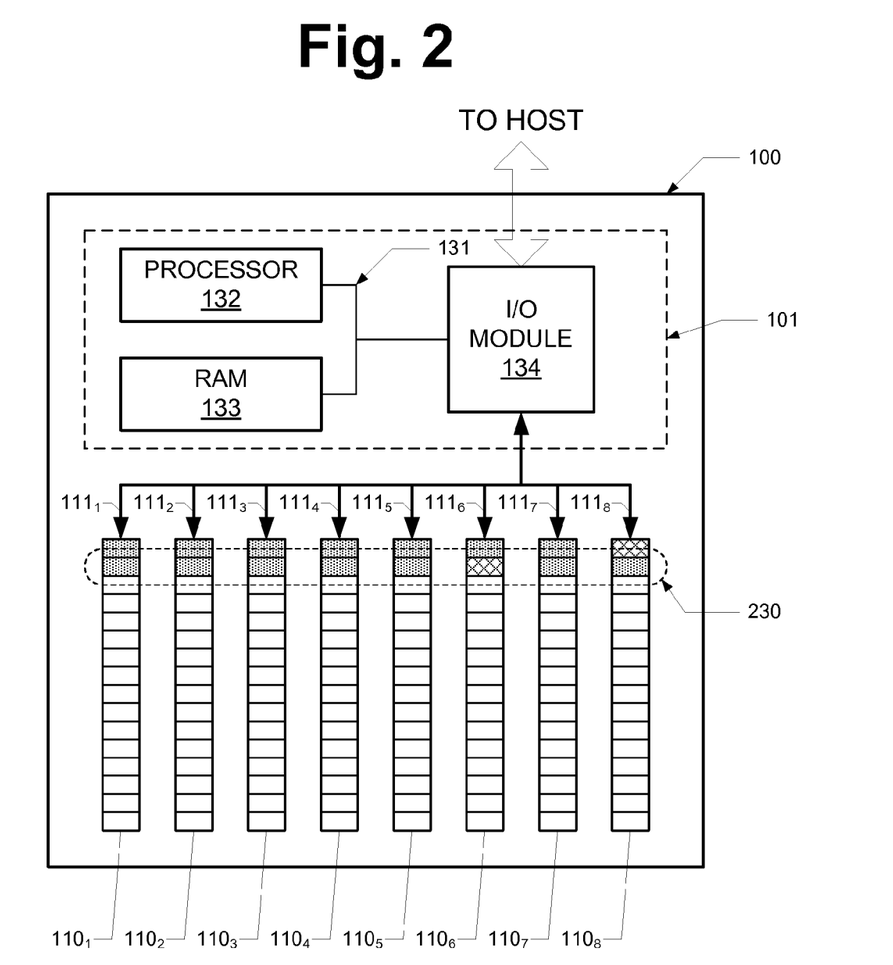
FIG. 2 illustrates a flash storage device in accordance with one aspect of the subject disclosure.

Rather than storing error correction information in the same channel for each data stripe, controller 101 may be configured to balance the amount of error correction information stored in each channel when writing multiple stripes of data to the flash storage array, in accordance with one aspect of the subject disclosure. For example, turning to FIG. 2, flash storage device 100 is illustrated after writing a subsequent stripe 230 to the flash storage array, in accordance with one aspect of the subject disclosure. As can be seen with reference to FIG. 2, controller 101 has written the error correction information to a data segment (illustrated with a hatched field surrounded by a black line) in data block $110_6$ via channel $111_6$.

Figure 3:
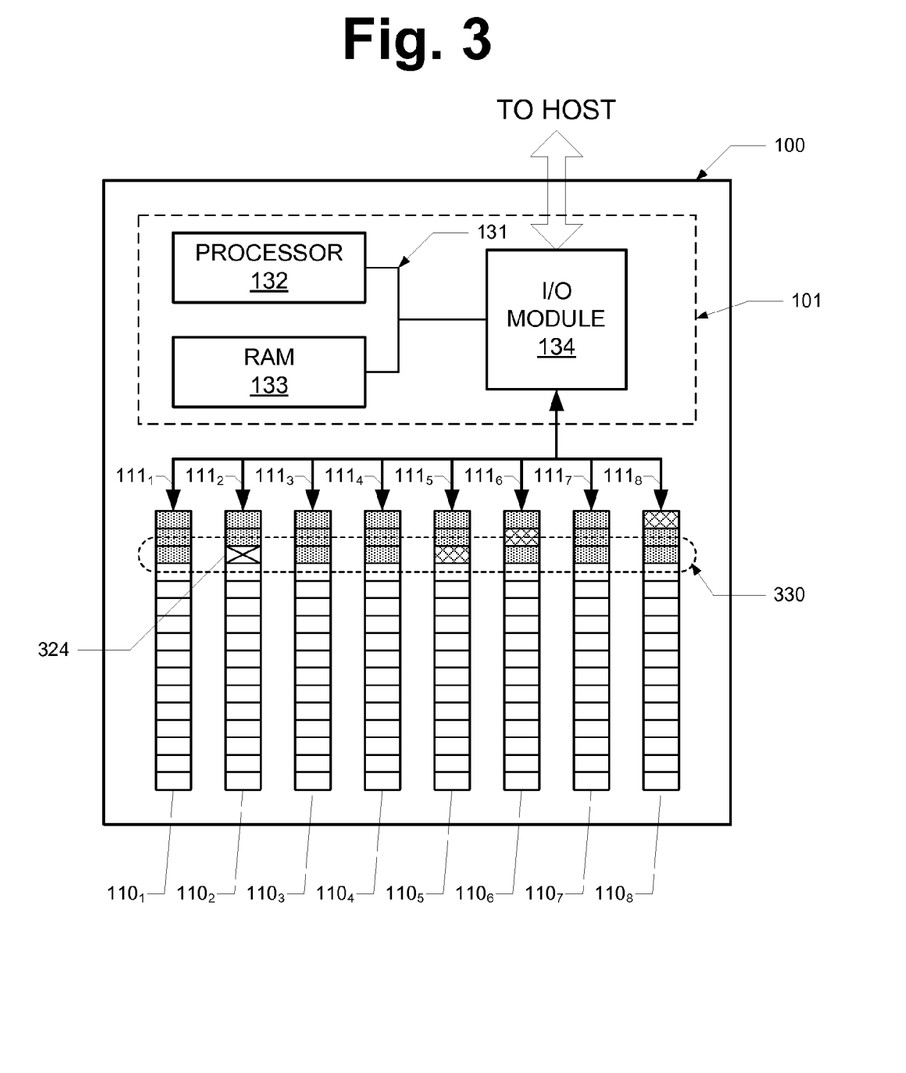
FIG. 3 illustrates a flash storage device in accordance with one aspect of the subject disclosure.

The number of portions into which controller 101 is configured to partition cached data may vary between different stripes. For example, FIG. 3 illustrates exemplary flash storage device 100 after performing a write operation to data stripe 330, in which the data portions occupy only 6 data segments in data blocks $110_1$, $110_3$, $110_4$, $110_5$, $110_6$, $110_7$ and $110_8$, and the error correction information occupies one additional data segment in data block $110_5$. In this regard, controller 101 has been configured to partition the data into fewer portions because data segment 324 in channel $111_2$ (i.e., in data block $110_2$ accessed via channel $111_2$) has been marked as "bad," as is illustrated with the graphical convention of a white field crossed and surrounded by black lines. Controller 101 may be configured to maintain a list of bad data segments (e.g., determined to be bad because of an excessive number of data errors associated therewith, or the like) which permit controller 101 to make stripe-size determinations on-the-fly. In this regard, while stripe 330 is illustrated as encircling data segments in each of data blocks $110_1$-$110_8$, data segment 324 is not actually part of data stripe 330.

In addition to determining a stripe size based upon an available number of "good" data segments, controller 101 may be configured to form stripes using less than the total number of channels in flash storage device for other reasons, in accordance with various other aspects of the subject disclosure. For example, turning to FIG. 4, controller 101 may be configured to form multiple stripes at the same address in different subsets of the total number of available channels. In the exemplary embodiment illustrated in FIG. 4, controller 101 has written data and error correction information to a first stripe 431 in channels $111_1$ to $111_4$ (i.e., to data blocks $110_1$ to $110_4$ accessed via channels $111_1$ to $111_4$) and to a second stripe 432 in channels $111_5$ to $111_8$ (i.e., to data blocks $110_5$ to $110_8$ accessed via channels $111_5$ to $111_8$). These stripes are located at the same address within their respective channels, inasmuch as the data segments in each stripe begin at a same offset from the first position in their respective channels.

Figure 4:
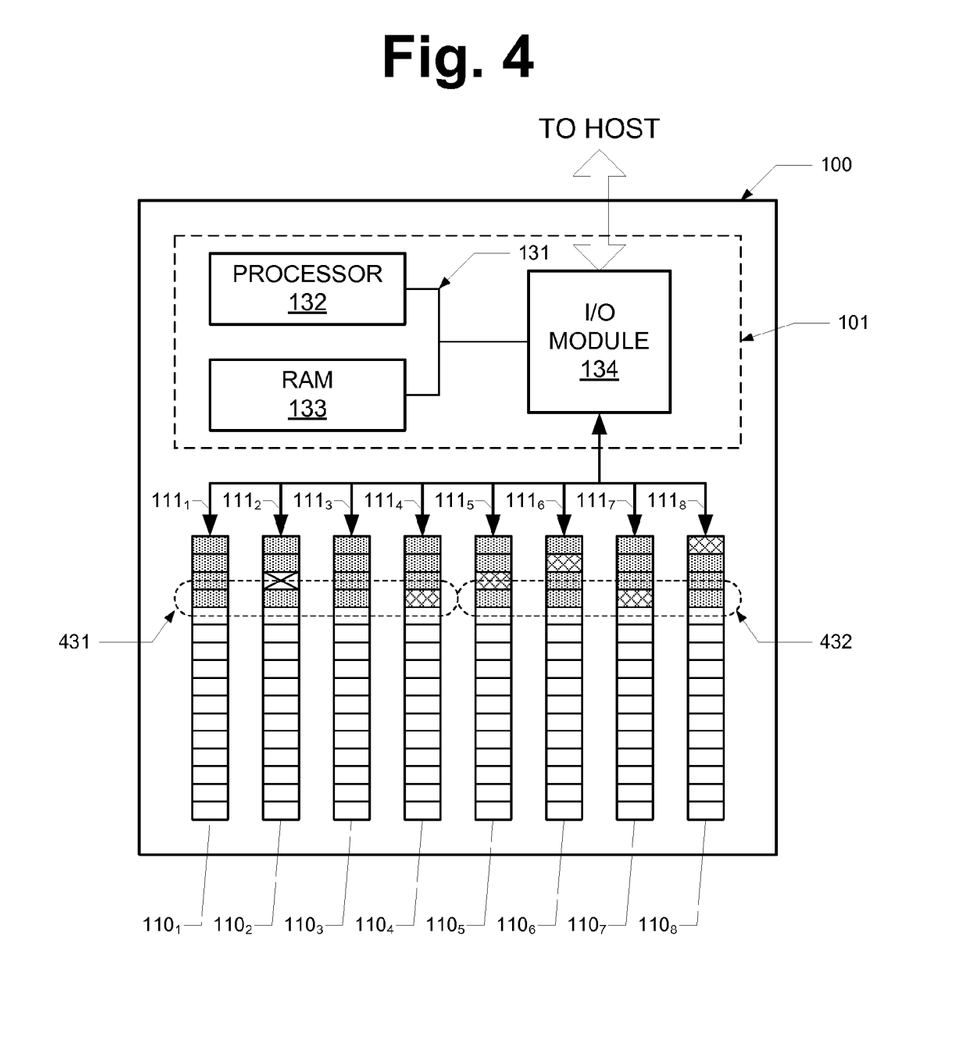
FIG. 4 illustrates a flash storage device in accordance with one aspect of the subject disclosure.

Using a smaller stripe size, such as the four-channel stripes 431 and 432 in FIG. 4, allows a flash storage device to read data and error correction information from fewer channels to rebuild data lost from one of channels (e.g., due to corruption), at the cost of utilizing more storage space for error correction information. For example, if controller 101 detects an error in the data of stripe 431 in channel $111_1$, it could rebuild that data using data from channels $111_2$ and $111_3$ and the error correction information in channel $111_4$, without having to read from any of channels $111_5$ to $111_8$.

Figure 5:
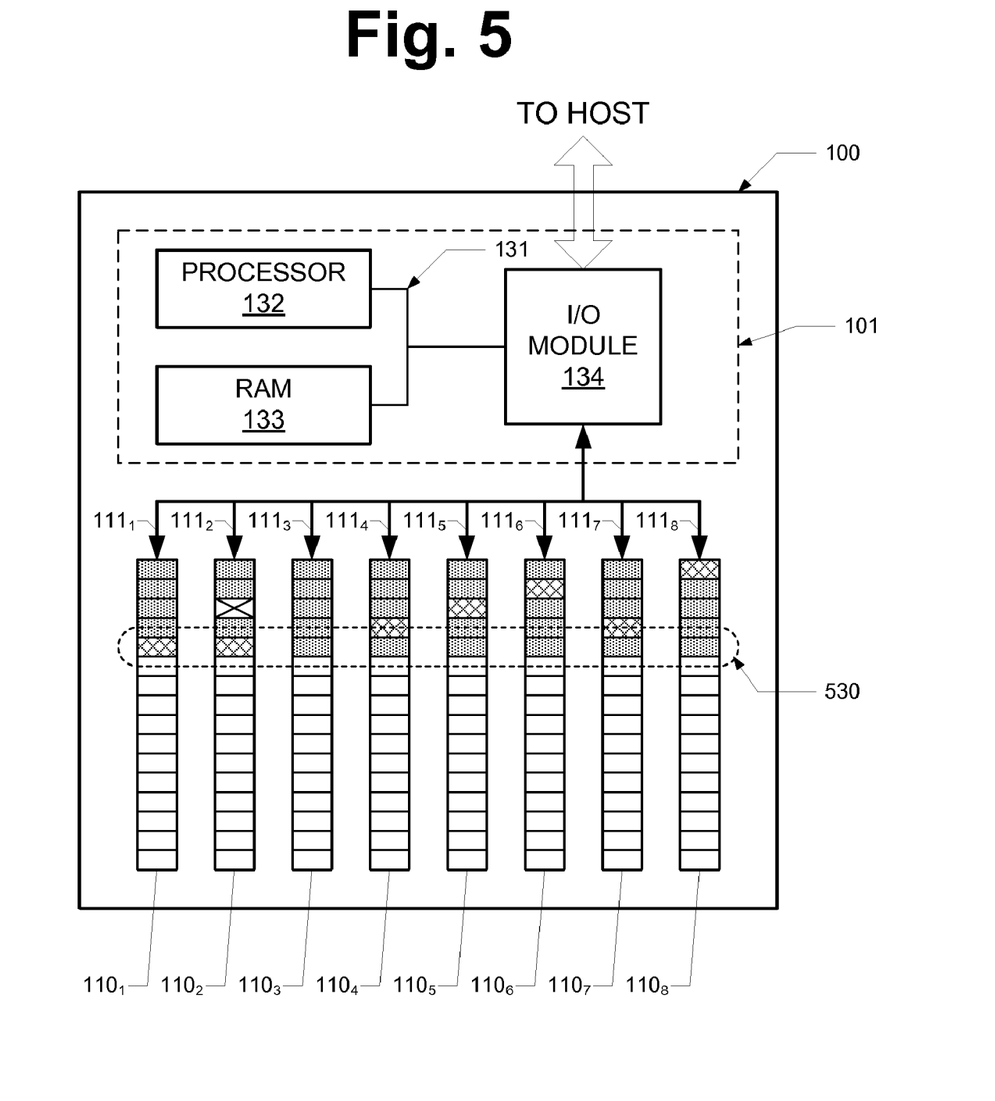
FIG. 5 illustrates a flash storage device in accordance with one aspect of the subject disclosure.

While in the foregoing exemplary embodiments, stripes have been illustrated as including a single channel in which error correction information is stored, the scope of the present invention is not limited to such an arrangement. Rather, a flash storage device may be configured to store error correction information in multiple channels of a data stripe. For example, according to one aspect of the subject disclosure, controller 101 may be configured to store multiple copes of the XOR information in different data channels, to ensure that the loss of one copy of the XOR information does not prevent data from elsewhere in the stripe from being rebuilt. Alternatively, controller 101 may be configured to generate different types of error correction information which may require more storage space than a single channel of the stripe can provide. For example, controller 101 may be configured to use any one of a number of different convolutional or block-by-block error correcting codes to generate error correction information. By allocating more space to error correction information (e.g., by allocating more than one channel of the stripe to store the error correction information), controller 101 may be able to store sufficient error correction information to allow more than one data portions of a stripe to be rebuilt after a read error. FIG. 5 illustrates one such exemplary arrangement, in which two data segments (in channels $111_1$ and $111_2$) of stripe 530 are used to store error correction information pertaining to the data segments in the rest of the stripe.

Figure 6:
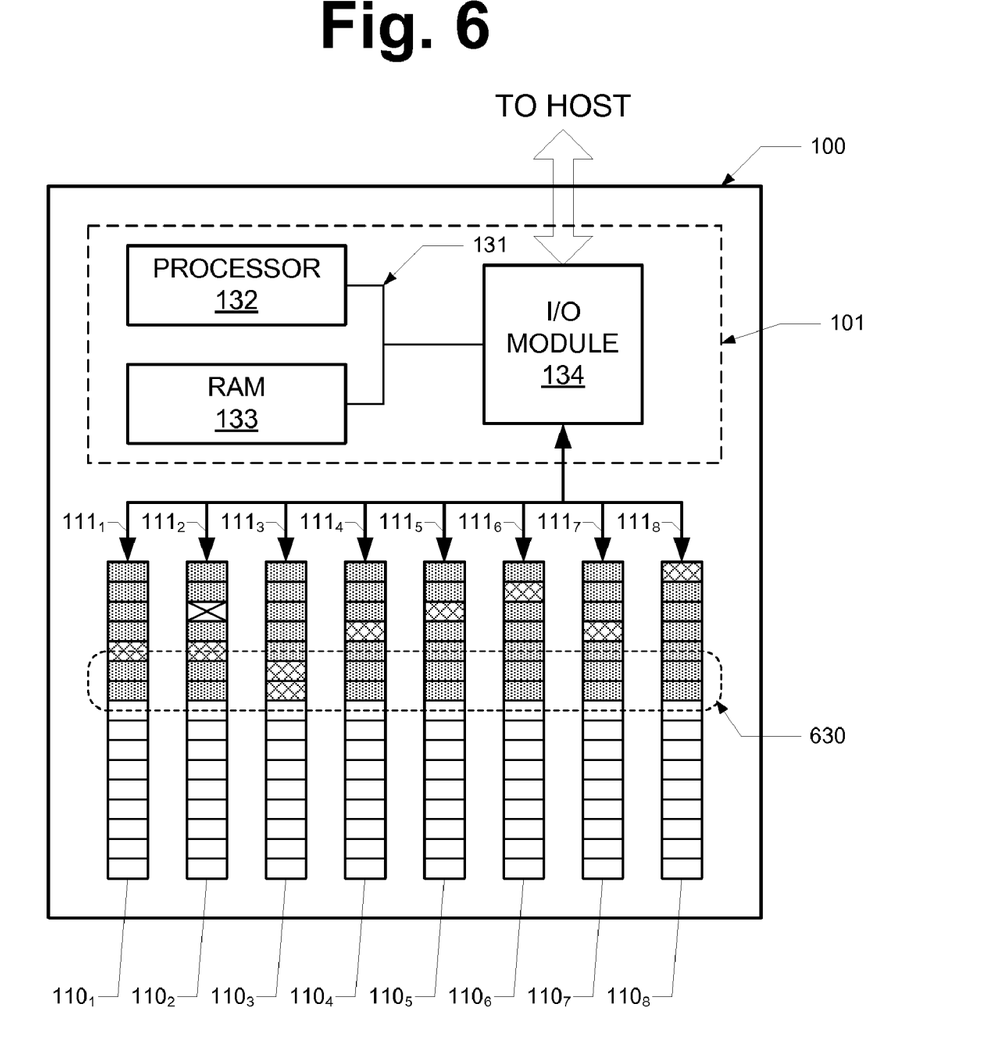
FIG. 6 illustrates a flash storage device in accordance with one aspect of the subject disclosure.

While in the foregoing exemplary embodiments, flash storage devices have been illustrated in which stripes of data include a single data segment from each channel, the scope of the present invention is not limited to such an arrangement. Rather, the present invention has application to flash storage devices in which stripes are provided with multiple data segments, or even multiple data blocks, per channel. For example, FIG. 6 illustrates one such exemplary embodiment, in which controller 101 is configured to write data to a stripe 630 in which two data segments from each of channels $111_1$ to $111_8$ are included. In this regard, controller 101 may still be configured to partition cached data into seven portions, where each data portion is sized to be stored within two data segments. Similarly, the error correction information stored in channel $111_3$ may occupy two data segments. According to another aspect of the subject disclosure, controller 101 may be configured to partition data into portions smaller than a single data segment, whereby multiple data portions may be stored in a single data segment (e.g., in a flash storage device in which multi-cycle programming is implemented).

As set forth in greater detail above, upon detecting a read error in one channel of a stripe, controller 101 is configured to read the data and error correction information from the other channels in the stripe to rebuild the lost data. Accordingly, when controller 101 is configured to change the data stored in one channel of the stripe, rather than rewriting the entire stripe, controller 101 may be configured to write the updated data to a new location in the flash storage array, to update an addressing table with the new physical address of the updated data, and to leave the outdated data intact in its current position, rather than marking that location for deletion. Leaving the outdated data in its position in the stripe preserves the integrity of the stripe (i.e., its redundancy and therefore its ability to recover from some amount of data loss), as the outdated data may be used to rebuild data from another channel in the stripe, as set forth in greater detail above. This arrangement may be more easily understood with reference to FIG. 7.

Figure 7:
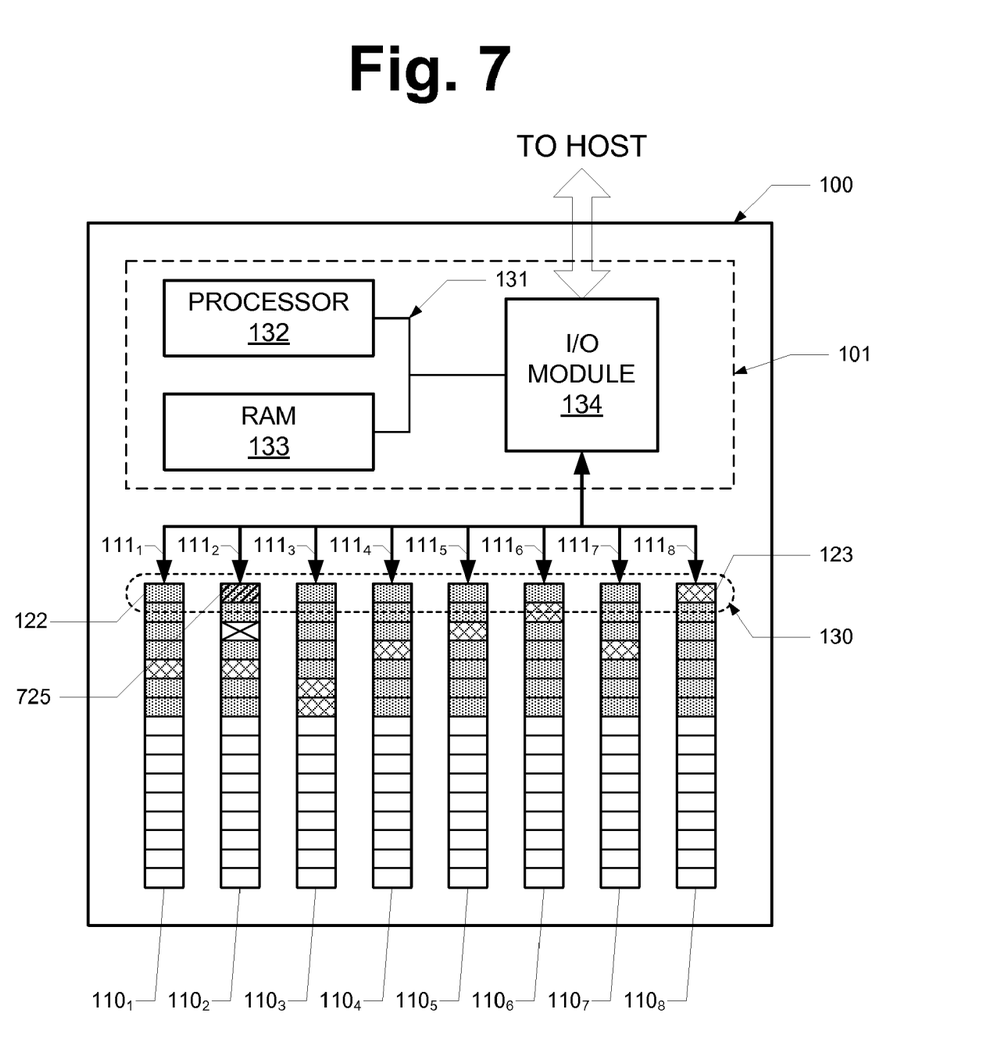
FIG. 7 illustrates a flash storage device in accordance with one aspect of the subject disclosure.

In FIG. 7, a new graphical convention is introduced, wherein a data segment from which outdated data has been copied to a new location is illustrated as a shaded field hatched with diagonal lines and surrounded by a black line. In this regard, controller 101 has identified data segment 725 as containing data which is to be changed or erased, has written the updated data to another location in the flash storage array, and has updated an addressing table correlating the new physical address of the updated data with the logical address thereof (or, if the data is to be erased, has simply removed an entry corresponding thereto from the addressing table). Rather than erasing data segment 725, however, controller 101 is configured to leave the data intact, in the event that the data is needed to rebuild data from another channel in stripe 130. For example, if controller determines that the data in data segment 122 has become corrupted, controller 101 will read the error correction information in data segment 123 and the data from the other data segments in the stripe, including data segment 725, to rebuild the data in data segment 122. While the data in data segment 725 is no longer up-to-date or "valid" from the point of view of the host device, the data is still preserved so that the entire stripe 130 does not need to be rewritten.

As the operation of reading data from a data segment may wear the data segment over time, controller 101 may be configured to perform one or more methods of wear leveling, in which data that is frequently read is moved periodically from one data segment to another, to prevent undue wear to any single data segment. Accordingly, frequently-read data may be treated similarly to the out-of-date data described above. In this regard, if controller 101 identifies a data segment in a particular stripe as containing frequently-read data, controller 101 may be configured to copy that data to another location in the flash storage array, to update an addressing table with the new address of the data, and to leave the data in the original data segment intact (e.g., and not configured to mark the data segment for erasure). Accordingly, while the data in the original location is no longer associated with any logical address in the addressing table (i.e., while no longer "valid"), the data is still preserved so that the entire stripe in which the data resides retains its redundancy.

According to one aspect of the subject disclosure, controller 101 may be configured to compress cached data before partitioning it and generating error correction information. Alternatively, controller 101 may be configured to compress cached data after partitioning it but before generating error correction information therefrom. Yet again, controller 101 may be configured to compress both data portions and error correction information after partitioning data into the data portions and generating the error correction information therefrom.

Figure 8:
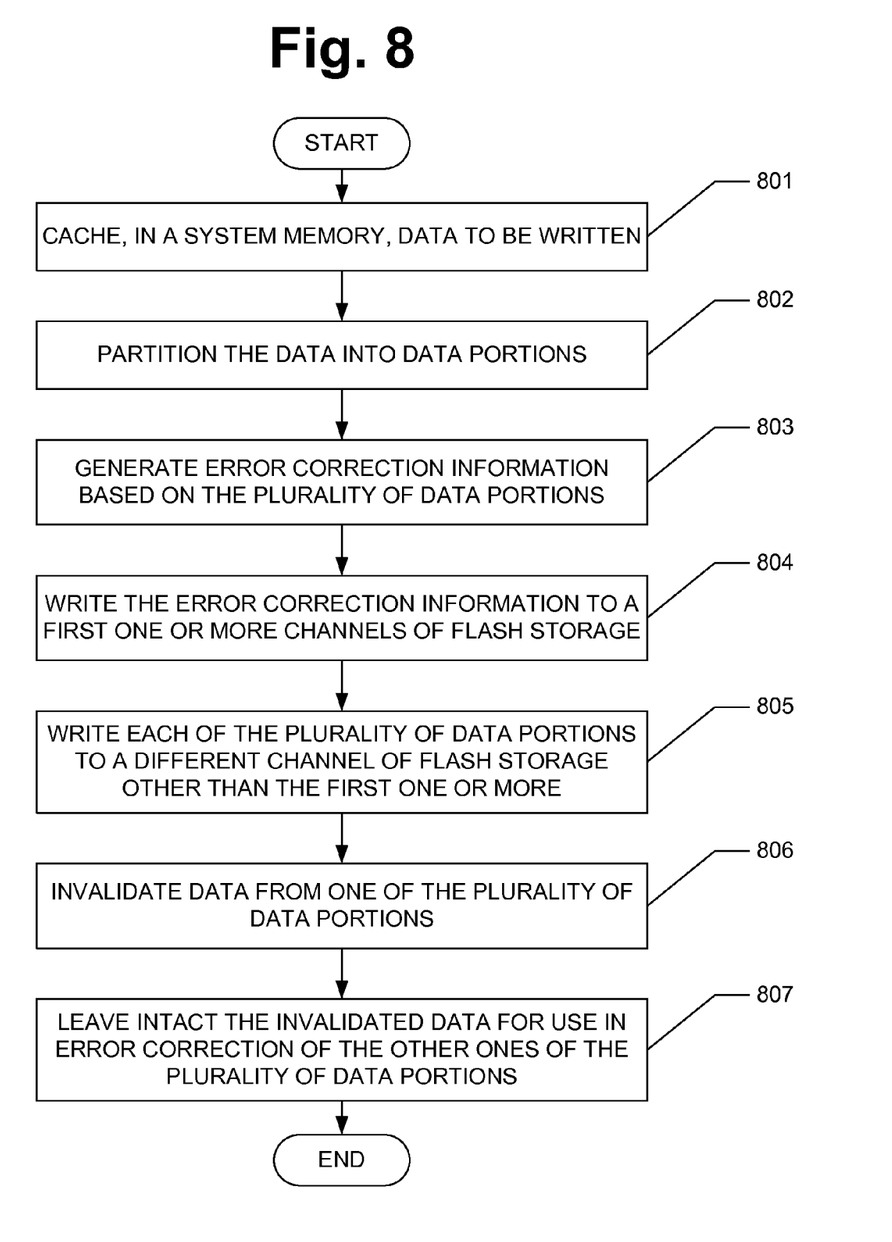
FIG. 8 is a flow chart illustrating a method for writing to a flash storage device in accordance with one aspect of the subject disclosure.

FIG. 8 is a flow chart illustrating a method for writing to a flash storage device in accordance with one aspect of the subject disclosure. The method begins with step 801, in which data to be written is cached in a system memory of the flash storage device. In step 802, the cached data is partitioned into a plurality of data portions. In step 803, error correction information is generated based on the plurality of data portions. The error correction information is written to a first one or more channels of flash storage in the flash storage device, in step 804. In step 805, each of the plurality of data portions is written to a different one of the plurality of channels of flash storage other than the first one or more to which the error correction information is written. It will be readily understood that the order of steps 804 and 805 is merely exemplary, as these steps may be performed in any order, or simultaneously. In step 806, data in one of the plurality of data portions is invalidated (e.g., due to a data erasure, a data update, a detection of excessive read count, or the like). In step 807, the invalidated data is left intact for use in the error correction of the other data portions in the stripe.

Figure 9:
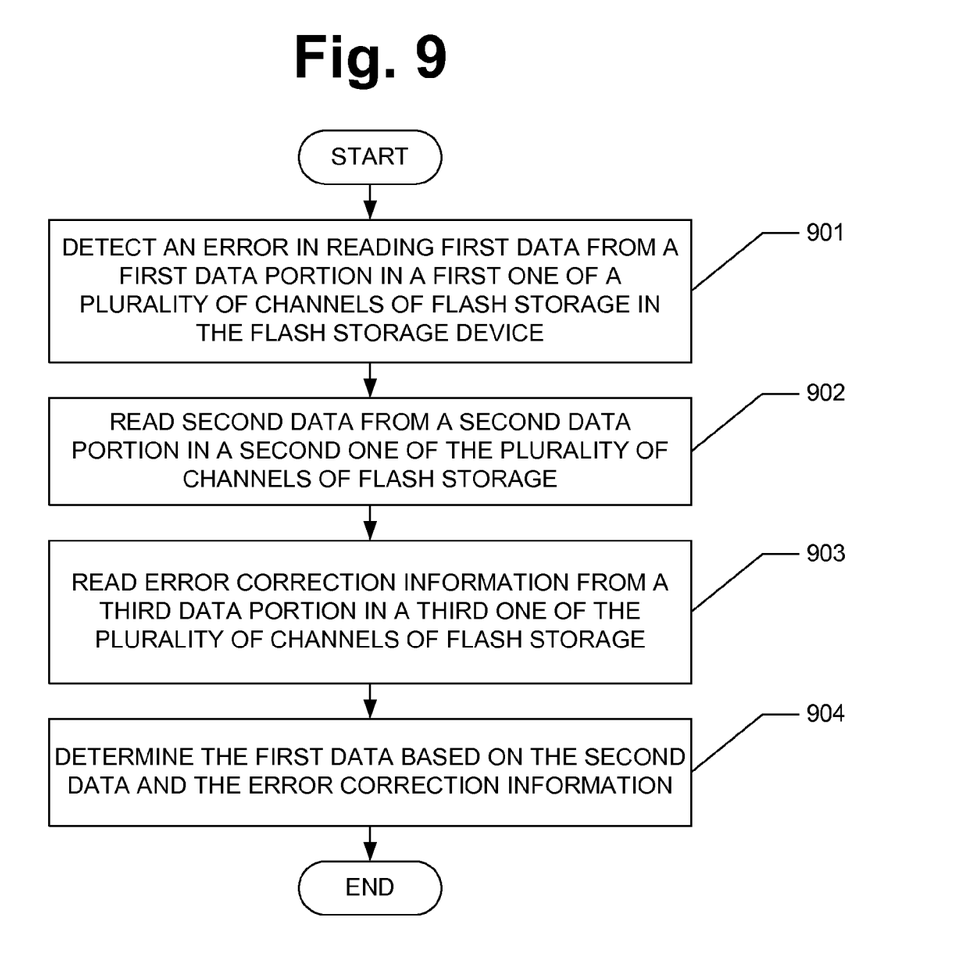
FIG. 9 is a flow chart illustrating a method for reading from a flash storage device in accordance with one aspect of the subject disclosure.

FIG. 9 is a flow chart illustrating a method for reading to a flash storage device in accordance with one aspect of the subject disclosure. The method begins with step 901, in which an error is detected in reading first data from a first data portion in a first one of a plurality of channels of flash storage in the flash storage device. In step 902, second data is read from a second data portion in a second one of the plurality of channels of flash storage, and in step 903, error correction information is read from a third data portion in a third one of the plurality of channels of flash storage. It will be readily understood that the order of steps 902 and 903 is merely exemplary, as these steps may be performed in any order, or simultaneously. In step 904, the first data is rebuilt or determined based on the second data and the error correction information.

Returning to FIG. 1, reading and/or writing data from and/or to a flash storage device may be performed by controller 101 in response to processor 132 executing one or more sequences of one or more instructions contained in a machine-readable media, such as RAM 133, or another volatile or non-volatile media, according to one aspect of the present invention. Such instructions may be read into the machine-readable media from another medium, such as through I/O module 134. Execution of the sequences of instructions contained in the machine-readable media causes processor 132 to perform the process steps described herein. One or more processors in a multi-processing arrangement may also be employed to execute the sequences of instructions contained in the machine-readable media. In alternative embodiments, hard-wired circuitry may be used in place of or in combination with software instructions to implement various embodiments of the present invention. Thus, embodiments of the present invention are not limited to any specific combination of hardware circuitry and software.

The term "machine-readable medium" as used herein refers to any medium that participates in providing instructions to processor 132 for execution. Such a medium may take many forms, including, but not limited to, non-volatile media, volatile media, and transmission media. Non-volatile media include, for example, optical or magnetic disks. Volatile media include dynamic memory, such as RAM 133. Transmission media include coaxial cables, copper wire, and fiber optics, including the wires that comprise bus 131. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A flash storage device, comprising:
    a plurality of channels of flash storage;
    a system memory; and
    a controller configured to:
        cache, in the system memory, data to be written;
        partition the data into a plurality of data portions;
        generate error correction information based on the plurality of data portions;
        write the error correction information to a first one or more of the plurality of channels of flash storage; and
        write each of the plurality of data portions to a different one of the plurality of channels of flash storage other than the first one or more thereof,
    wherein the controller is further configured to compress the plurality of data portions before generating the error correction information.

2. The flash storage device according to claim 1, wherein the plurality of channels comprises n channels, and wherein the controller is configured to partition the data into n−1 data portions.

3. The flash storage device according to claim 1, wherein the plurality of channels comprises n channels, wherein the first one or more channels comprises m channels, and wherein the controller is configured to partition the data into n−m data portions.

4. The flash storage device according to claim 1, wherein the plurality of channels comprises n channels, wherein the first one or more channels comprises m channels, and wherein the controller is configured to partition the data into fewer than n−m data portions.

5. The flash storage device according to claim 1, wherein the data portions and the error correction information are written to a same address in each of the corresponding channels.

6. The flash storage device according to claim 1, wherein the controller is configured to generate the error correction information by performing an XOR operation on the plurality of data portions.

7. The flash storage device according to claim 1, wherein the controller is configured to generate the error correction information using error-correcting code on the plurality of data portions.

8. The flash storage device according to claim 1, wherein the controller is further configured to determine a number of data portions into which the data is partitioned based upon a number of available data segments in the plurality of channels of flash storage.

9. A method of writing data to a flash storage device, comprising the steps of:
    caching, in a system memory, data to be written;
    partitioning the data into a plurality of data portions;
    compressing the plurality of data portions;
    generating error correction information based on the compressed plurality of data portions;
    writing the error correction information to a first one or more of a plurality of channels of flash storage of the flash storage device; and
    writing each of the plurality of data portions to a different one of the plurality of channels of flash storage other than the first one or more thereof.

10. The method according to claim 9, wherein the plurality of channels comprises n channels, and wherein the data is partitioned into n−1 data portions.

11. The method according to claim 9, wherein the plurality of channels comprises n channels, wherein the first one or more channels comprises m channels, and wherein the data is partitioned into n−m data portions.

12. The method according to claim 9, wherein the plurality of channels comprises n channels, wherein the first one or more channels comprises m channels, and wherein the data is partitioned into fewer than n—m data portions.

13. The method according to claim 9, wherein the data portions and the error correction information are written to a same address in each of the corresponding channels.

14. The method according to claim 9, wherein the error correction information is generated by performing an XOR operation on the plurality of data portions.

15. The method according to claim 9, wherein the error correction information is generated using error-correcting code on the plurality of data portions.

16. The method according to claim 9, further comprising:
    determining a number of data portions into which the data is partitioned based upon a number of available data segments in the plurality of channels of flash storage.

17. A flash storage device, comprising:
    a plurality of channels of flash storage;
    a system memory; and
    a controller configured to:
        cache, in the system memory, data to be written;
        partition the data into a plurality of data portions;
        generate error correction information based on the plurality of data portions;
        write the error correction information to a first one or more of the plurality of channels of flash storage; and
        write each of the plurality of data portions to a different one of the plurality of channels of flash storage other than the first one or more thereof,
    wherein the controller is further configured, upon a read count for one of the plurality of data portions in the corresponding channel of flash storage exceeding a predetermined amount, to:

invalidate data from one of the plurality of data portions; and leave intact the invalidated data for use in error correction of the other ones of the plurality of data portions.

18. The flash storage device according to claim 17, wherein the plurality of channels comprises n channels, and wherein the controller is configured to partition the data into n−1 data portions.

19. The flash storage device according to claim 17, wherein the plurality of channels comprises n channels, wherein the first one or more channels comprises m channels, and wherein the controller is configured to partition the data into n−m data portions.

20. The flash storage device according to claim 17, wherein the plurality of channels comprises n channels, wherein the first one or more channels comprises m channels, and wherein the controller is configured to partition the data into fewer than n−m data portions.

21. The flash storage device according to claim 17, wherein the data portions and the error correction information are written to a same address in each of the corresponding channels.

22. The flash storage device according to claim 17, wherein the controller is configured to generate the error correction information by performing an XOR operation on the plurality of data portions.

23. The flash storage device according to claim 17, wherein the controller is configured to generate the error correction information using error-correcting code on the plurality of data portions.

24. The flash storage device according to claim 17, wherein the controller is further configured to determine a number of data portions into which the data is partitioned based upon a number of available data segments in the plurality of channels of flash storage.

25. A method of writing data to a flash storage device, comprising the steps of:
caching, in a system memory, data to be written;
partitioning the data into a plurality of data portions;
generating error correction information based on the plurality of data portions;
writing the error correction information to a first one or more of a plurality of channels of flash storage of the flash storage device;
writing each of the plurality of data portions to a different one of the plurality of channels of flash storage other than the first one or more thereof;
invalidating data from one of the plurality of data portions; and
leaving intact the invalidated data for use in error correction of the other ones of the plurality of data portions.

26. The method according to claim 25, wherein the plurality of channels comprises n channels, and wherein the data is partitioned into n−1 data portions.

27. The method according to claim 25, wherein the plurality of channels comprises n channels, wherein the first one or more channels comprises m channels, and wherein the data is partitioned into n−m data portions.

28. The method according to claim 25, wherein the plurality of channels comprises n channels, wherein the first one or more channels comprises m channels, and wherein the data is partitioned into fewer than n−m data portions.

29. The method according to claim 25, wherein the data portions and the error correction information are written to a same address in each of the corresponding channels.

30. The method according to claim 25, wherein the error correction information is generated by performing an XOR operation on the plurality of data portions.

31. The method according to claim 25, wherein the error correction information is generated using error-correcting code on the plurality of data portions.

32. The method according to claim 25, further comprising:
determining a number of data portions into which the data is partitioned based upon a number of available data segments in the plurality of channels of flash storage.

* * * * *